June 16, 1959

J. N. WEILAND 2,890,777

TORQUE TRANSMITTING DEVICE

Filed Dec. 3, 1953

INVENTOR
John N. Weiland
BY George Knowles
ATTORNEY

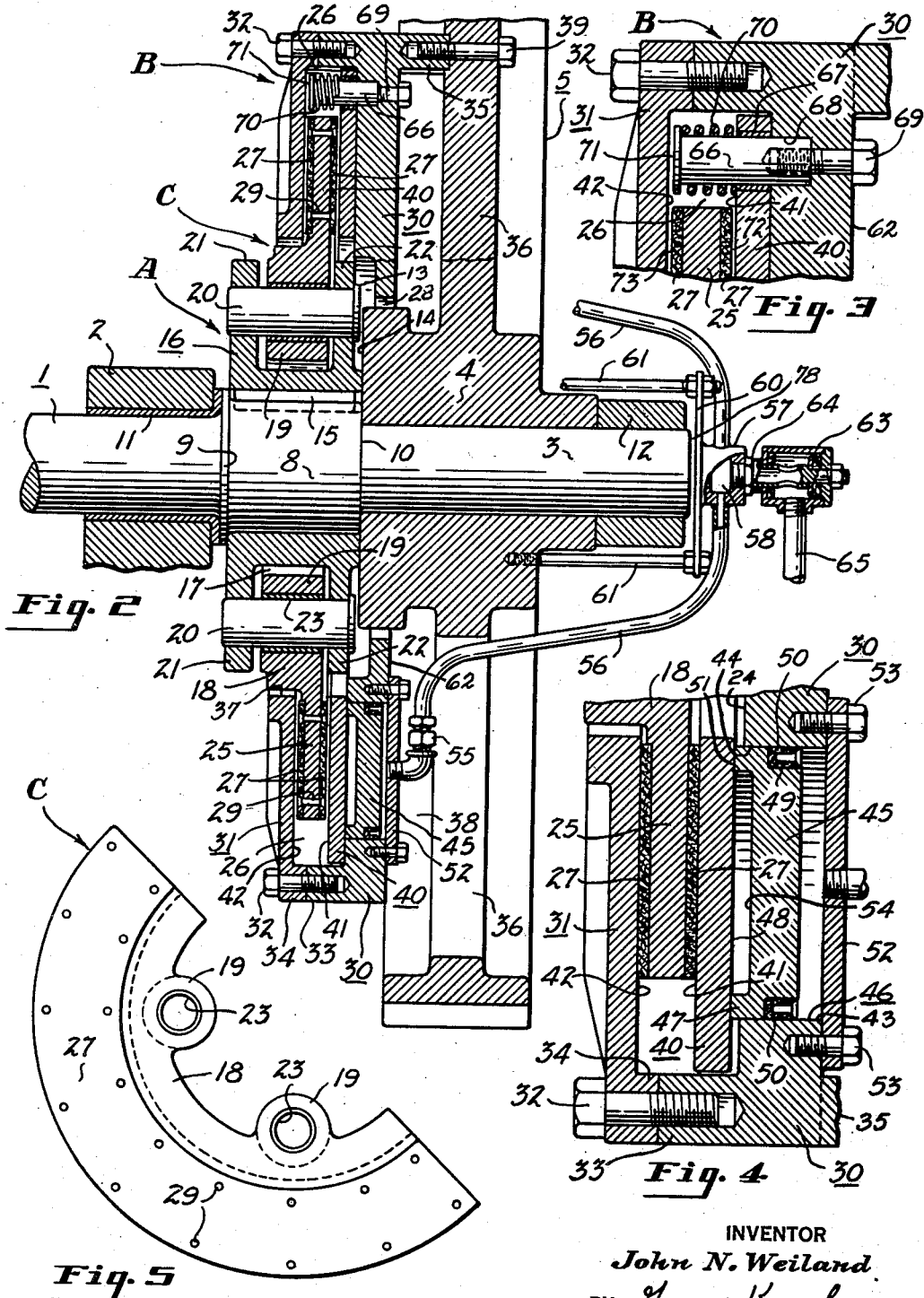

United States Patent Office 2,890,777
Patented June 16, 1959

2,890,777
TORQUE TRANSMITTING DEVICE

John N. Weiland, Cleveland, Ohio

Application December 3, 1953, Serial No. 395,920

10 Claims. (Cl. 192—85)

This invention relates to torque transmitting devices and more particularly to releasable friction clutches of the fluid operated type.

It is known that efforts have been made to provide fluid operated devices of the character mentioned in which a hydraulic piston-cylinder assembly or equivalent fluid motor acts directly on the shoe or friction element to be energized. Results previously obtained have not been entirely satisfactory, one reason being that the large forces involved require stress resisting connections other than the fluid motor. Another reason is that the large amount of heat generated during normal operation requires that provision be made to minimize the transfer of heat from the shoe or friction element to the hydraulic or fluid motor assembly. The general geometry of such a device also militates against designs providing for action of the fluid motor or motors along a line or lines normal to the friction surfaces and parallel to the rotational axis of the device, an arrangement considered highly desirable for efficient positive action.

It is, therefore, one of the principal objects of the present invention to provide a device of the character referred to in which the objections and difficulties mentioned, and others, are largely overcome. More specifically, it is sought to provide a hydraulic clutch of the radial type in which the friction surfaces are brought together by axial movement of one member relative to the other.

Another object is to provide a friction type torque transmitting device in which the members are mounted for relative rotation about a common axis or are adapted to be so mounted as in applying the device to a press or similar machine and in which a friction surface on one of the members is engaged by a friction element carried by the other member. The friction element is so arranged as to be under the influence of a fluid motor also carried by such other member, the fluid motor in turn being arranged and adapted to act along a line spaced radially from and preferably parallel to the rotational axis of the device. As a further refinement of this aspect of the invention the friction element is acted upon simultaneously by a plurality of fluid motors that act in unison along lines which are equally spaced from the rotational axis and are preferably parallel to such axis. The several fluid motors, which are envisioned as piston-cylinder assemblies, are located in angularly spaced relation about the axis of the device at substantially uniform circumferential distances from one another. Means common to all the fluid motors supplies them with hydraulic fluid under pressure to obtain simultaneous energization of the motors and resultant actuation of the device by axial forces working between the friction components simultaneously at points spaced uniformly about the device's rotational axis.

As a specialized objective of the invention it is sought to provide a radial shoe type clutch in which a shoe carried by one member of the clutch is gripped between parts of the other member by relative axial movement of such parts. The friction shoe preferably is arranged for relative axial movement with respect to the rotary member on which it is carried, the shoe having a base interlocked with the rotary member. Here the interlock of the shoe base and the rotary member is effected by guide pins spaced about the rotational axis of the device and parallel to such axis. A plurality of the friction shoes are employed, each shoe being carried by at least two of the pins.

As a convenient arrangement economical to manufacture, assemble and service the invention provides arcuately curved shoes, preferably a pair, each semicircular in extent, the curved bases of the shoes being located along their inner edges and being received symmetrically in a circumferential channel of the rotary member on which the shoes are mounted. The guide pins for the shoes are thus conveniently supported in the side walls of the channel and extend through bores or similar slideways in the shoe bases which permit axial shifting of the shoes on the guide pins, it being understood that the circumferential channel in the rotary member is sufficiently wide to provide side clearances along the shoe bases for such axial sliding of the shoes.

The gripping of the friction shoe is effected by relative axial movement of a friction element which is carried by the other of the rotary members of the device, such friction element being relatively movable axially on the member carrying it and coacting with an opposed part of such other member in such a way as to grip the shoe or shoes therebetween. The friction shoe or shoes extend radially outwardly from the rotary member on which mounted and are received within a circular inwardly directed channel formed by the other or outer rotary member of the device. The friction element is also received within such channel. To transmit the circumferential or torque forces the axially movable friction element is mounted as on a number of parallel axially directed pins supported in the outer rotary member, these pins serving also as supports for retraction springs which act on the friction element to withdraw it from frictional engagement with the shoe or shoes.

Another object is to provide a device of the character mentioned in which an axially shiftable friction element is operated by a plurality of fluid motors spaced circumferentially about the element. As a preferred version the fluid motors comprise piston-cylinder assemblies and the pistons react directly against the friction element.

Another object is to provide a fluid operated clutch for mounting on the drive shaft of a press or similar machine in substitution of jaw or other type clutch, the present clutch being designed and arranged to be accommodated within the same profile as the earlier clutch so that the conversion can be effected with minimum difficulty and expense and without interference by other parts of the machine.

Other objects and advantages pertain to certain novel features of construction and combinations and arrangements of parts which provide a simple torque transmitting device economical to manufacture.

The following detailed description of a preferred embodiment of the invention is made in connection with the accompanying drawings forming a part of the specification.

In the drawings:

Fig. 2 is a sectional view with parts broken away and removed, taken substantially along the line 2—2 of Fig. 1;

Fig. 3 is a fragmentary sectional detail showing the mounting pins for supporting the frictional element, this view being taken substantially along the line 3—3 of Fig. 1 and enlarged with respect to that figure;

Fig. 4 is a fragmentary sectional detail showing the gripping of one of the clutch shoes between the parts of the outer clutch member; and Fig. 5 is an elevational detail showing one of the semicircular friction shoes.

Figure 1:
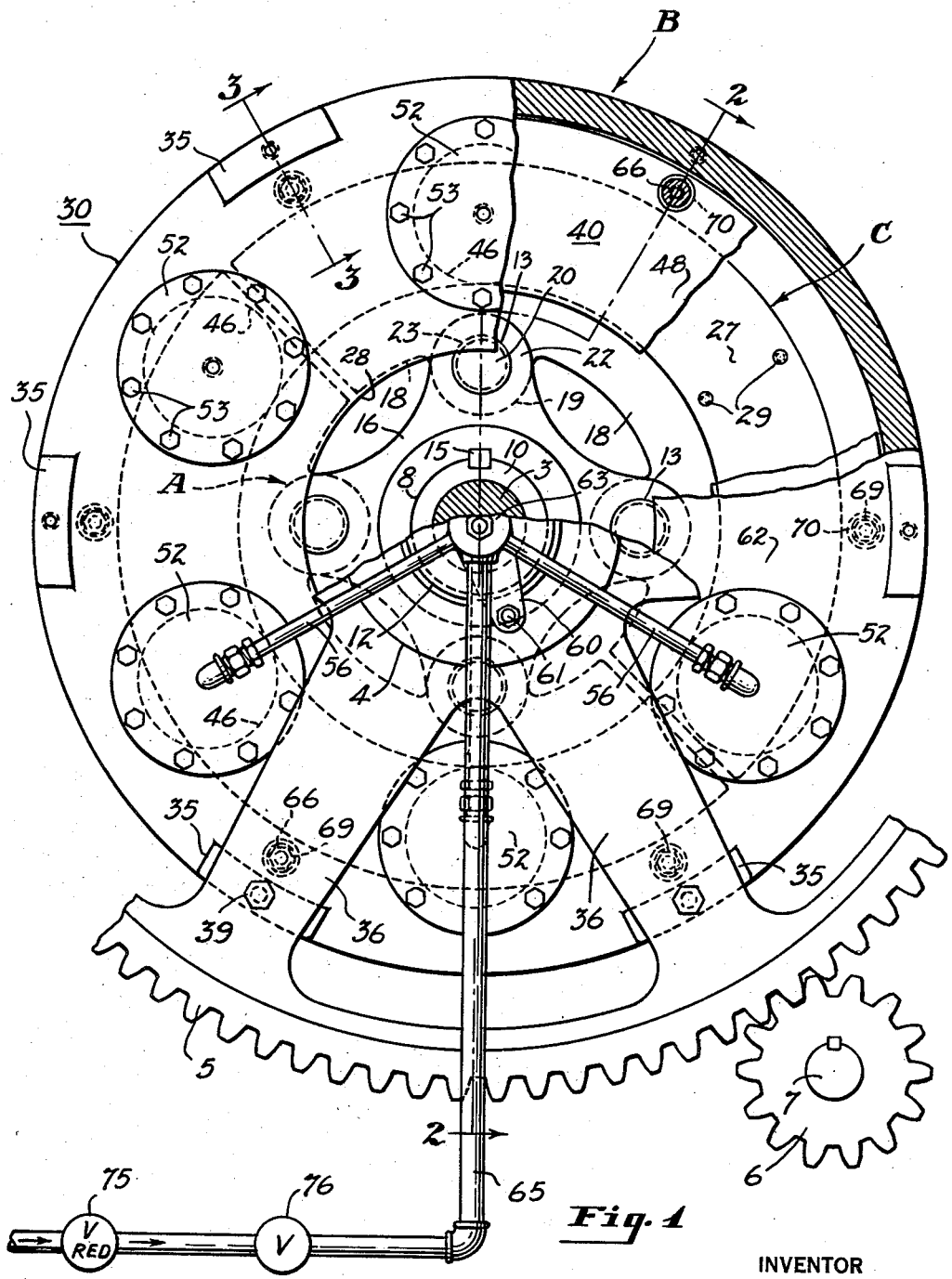
Figure 1 is an elevational view, partly diagrammatic, partly in section and with parts broken away and removed, showing a fluid operated clutch or torque transmitting device embodying the principles of the present invention and the manner in which the device is mounted on the shaft of a press or similar machine.

In stamping or punching machines or presses it is customary for a main shaft to carry and be driven by a pulley or gear. The pulley or gear may run free on the main shaft and be operatively connected to the shaft through a suitable clutch device each time it is desired to actuate the shaft in a punching, stamping or similar operation. Thus the pulley or gear wheel may be driven continuously by a suitable motor or other prime mover and may constitute a flywheel or inertia device for storing energy until the instant of use. The torque transmitting clutch device of the present invention is particularly advantageous for connecting the pulley or gear flywheel to the crankshaft of a press and is so illustrated in the drawings, it being understood, of course, that the principles of the invention and the device illustrated have other applications.

The crankshaft of the press is indicated at 1, being journaled in the press frame, a fragment of which frame is indicated at 2. The shaft projects cantilever fashion beyond the press frame. On the outside of the frame the projecting shaft end, here shown as a reduced diameter portion 3, receives hub 4 of press flywheel gear 5. The flywheel has a running fit on the shaft end 3, being driven as by a spur gear 6 keyed to a drive shaft 7 that may be the shaft of an electric motor or may be a stub shaft journaled in the press frame and operated continuously from any suitable prime mover in accordance with conventional practice.

Also carried on the crankshaft 1 of the press is the clutch device of the present invention, which comprises an inner composite member A carried by the shaft and an outer composite member B carried by the flywheel gear 5. Desirably the press crankshaft 1 may include a portion 8 intermediate the press frame 2 and the reduced shaft end portion 3, the portion 8 being of larger diameter than the other portions of the shaft in the provision of axially spaced circumferential shoulders 9 and 10. Shoulder 9 engages the flanged end of shaft bushing 11 to resist end thrust and thereby locate the shaft in the press frame. The shoulder 10 serves as an abutment for the hub 4 of the gear wheel to locate the latter on the shaft end portion 3. A retaining nut or collar 12 on the extreme end of the shaft holds the gear wheel in place and permits it to rotate on the shaft.

The inner composite member A of the clutch assembly includes a circular body or hub 16 received on the shaft portion 8 and secured against rotation on the latter as by a key 15. Outwardly directed spaces or channels 17 in the body 16 and concentric to the rotational axis receive base portions 18 of a pair of arcuately curved semicircular friction shoes C. Each of the shoe assemblies is formed with a pair of spaced bosses 19 integral with the shoe base, the bosses being apertured transversely to the plane of the shoe to receive pins 20 on which the shoes are guided and supported in the channel spaces 17. The pins 20 are supported at their ends in axially spaced flange portions 21 and 22 of the body 16 which define the channel spaces 17. The pins 20 have heads 13 seated against the sides of the flanges 22 of the hub 16 and thus disposed between the latter and end face 14 of the wheel hub 4. The pins may be threaded into the flanges of the hub body or, as shown, they may be drive or shrink fitted. Bushings 23 held in the bores of the guide bosses 19 permit free axial sliding of the semicircular shoes on the guide pins, it being understood that the guide pins 20 are all parallel to and equidistant from the axis of the device, which axis coincides with the axis of the main crankshaft 1. The guide pins are also spaced equally about the rotational axis of the device although other spacings can be used.

Projecting radially outwardly from the base portion 18 of each shoe is a semicircular integral flange 25 received within inwardly directed annular channel 26 of the outer composite clutch member B. On the oppositely directed faces of the shoe flanges 25 are flat surfaced arcuate facings or linings 27 of wear resisting material for engagement by the companion surfaces of the outer composite member B, as will later appear. The friction facings or linings are suitably held to the shoe flanges as by adhesive or countersunk rivets 29.

The outer composite clutch member B comprises a main ring 30 and a supplemental ring 31 secured together at their outer peripheries as by circumferentially spaced cap screws 32 and having their inwardly directed side faces 24 and 42, respectively, disposed in spaced confronting relation. The two rings are formed with integral marginal rim flanges 33 and 34 directed toward one another axially and of equal diameter, these flanges being in edgewise abutment and constituting spacing means determinative of the axial width of the annular channel 26. The cap screws 32 are received through openings in the rim flange 34 of the supplemental ring 31 and are threaded into rim flange 33 of the main ring 30.

On the side opposite the supplemental ring 31 the main ring 30 is formed with axially projecting means for attachment of the outer composite member B to the gear wheel 5 with outwardly directed side face 62 of the ring member 30 in spaced relation to the spokes of the gear wheel and with one end of the hub of the latter received through central opening 28 of the ring member. The attaching means may take the form of an annular ring flange at the outer periphery of the main member 30 or, as here shown, may comprise a series of circumferentially spaced axially directed lugs 35, the spacing of which coincides with the spacing of spokes 36 of the gear wheel 5. The lugs abut flats provided on the sides of the spokes and constitute spacers in the provision of a clearance 38 between the plane of the spokes and the body of the main ring 30. Cap screws 39 are received through drill holes in the gear wheel spokes 36 and are threaded into sockets in the spacers or standoff lugs 35 of the main ring 30. As shown in Fig. 1 the lugs 35 are so located as to position the gear wheel spokes intermediate the working axes of the fluid motor assemblies to be later described. The supplemental ring 31 has a central opening 37 through which project the hub 16 and the base portions 18 of the shoe assemblies.

Received within the annular channel 26 of the outer composite clutch member B and spaced from the supplemental ring 31 so as to receive therebetween the lining surfaced flanges 25 of the friction shoe assemblies C is a friction element which here takes the form of a flat ring 40. This ring, which may be of cast or rolled ferrous metal, has a flat axially directed side surface 41 which confronts a similar surface 42 on the inside of the supplemental ring 31. These surfaces are parallel to one another and frictionally clamp between them the shoes assemblies C when the clutch is actuated, as will appear.

To obtain axial shifting of the friction ring element 40 in producing the clamping action mentioned, the friction element is subjected to the force of a plurality of fluid motors distributed about the circumference of the ring element and carried by the main ring 30 of the outer composite member B. One of the advantageous features of the present invention is that these fluid motors are so mounted as to react directly against side face 48 of the movable friction element 40, a further feature being that the line of action of each fluid motor is parallel to the rotational axis of the device and spaced radially therefrom. The lines of action of the several fluid motors are symmetrically arranged as by being equally spaced from the rotational axis of the device and are so distributed about the friction element 40 as by being at equal circumferential distances that the clutch energizing forces applied to the friction element are symmetrically balanced and produce a smooth, uniform clutch action the frictional effects of which are distributed uniformly about the entire circumferential extent of the device.

In the preferred construction illustrated the fluid motor assemblies each comprises a piston 45 slidable in a cylindrical bore 46 formed axially in the main ring 30. The pistons are of stub form, being several times greater in diameter than axial length so that relatively large working forces can be developed at low fluid pressures and so that the over-all axial profile of the device can be held to a minimum. At its outer or working end each piston is formed with a central relieved area providing a recess 54 surrounded by a short annular flange or skirt 47 which has circular thrust face 51 that bears directly against rear face 48 of the friction element 40. At its other or inner end each piston is formed with a peripheral rabbet 49 that receives an annular sealing ring 50 of suitable oil resistant synthetic rubber. The ring 50 is suitably contoured, being, for example, U-shaped in cross section, to constitute a seal that is effective to prevent objectionable loss or escape of fluid from the cylinder 46 past the head end of the piston.

The cylinders 46 may, if desired, be blind bores in the main ring 30, though it is preferred for reasons of economy and to facilitate servicing of the device to use through bores, as shown. The open inner ends 43 of the cylinders at the head ends of the pistons are closed as by circular metal plates or heads 52 which are secured to the outwardly directed rear face 62 of the main ring 30 as by cap screws 53 received through circumferentially spaced marginal holes in the heads. The use of a plurality of the fluid motor assemblies equal in number to the spokes of the gear wheel and the distribution of the assemblies about the device so as to center them in the angles between the spokes facilitates the removal and replacement of the heads 52 and the pistons 45 as for servicing or repairing the parts without removing the device from the gear wheel. Each of the heads 52 is centrally bored and tapped to receive a strut-L which in turn receives a fluid coupling 55 on the end of a tubular conduit 56. The several conduits radiate from a common header 57 on the rotational axis of the device. From chamber 58 in the header 57 hydraulic fluid is supplied simultaneously to all of the fluid motor assemblies through the radial conduits 56.

To support the header 57 on the rotational axis of the device it is brazed or welded to a plate 60 positioned beyond the end 78 of the projecting portion 3 of the main shaft, the plate being supported in a plane normal to the shaft axis on standoff studs 61 threaded into the hub 4 of the gear wheel 5. A rotary coupling 63 is mounted for relative turning on a hollow spindle 64 threaded into the header 57 on the rotational axis of the device, the coupling or fitting receiving air or other hydraulic fluid under pressure from a suitable source through conduit 65. When the gear wheel 5 is turning the rotary coupling 63 relatively turns on the spindle 64 and permits hydraulic fluid under pressure to flow simultaneously to all the cylinders 46 through suitable radial openings in the hollow spindle 64 in accordance with the known operation of rotary fluid couplings. The supply of the hydraulic fluid is controlled as by conventional pressure reducing and shutoff valves indicated at 75 and 76, respectively, it being understood that solenoid and other remotely actuated valves may be employed to provide any desired control setup.

Provision is made for eliminating circumferential and radial forces from the connections between the friction ring element 40 and the several piston-cylinder assemblies which constitute the actuating fluid motors. This is accomplished by supporting the friction element 40 for relative axial sliding nonrotative movement as on axial guide pins 66 received through bushings 67 press fitted in suitable apertures in the outer periphery of the friction ring element. These pins 66 are here spaced uniformly about the periphery of the friction element and extend into cylindrical axial sockets 68 in the main ring 30 of the outer composite member B. Cap screws 69 extend through drill holes in the main ring 30 and are threaded into the ends of the pins 66 to draw and hold the latter bottomed in the sockets 68. The friction ring element 40 is freely slidable on the pins 66 toward and away from the inside face 42 of the supplemental ring 31. Movement toward such companion surface is effected by the axial pressure exerted by the pistons 45 projecting through open outer ends 44 of the cylinders 46 when high pressure hydraulic fluid is admitted to the cylinders 46 through the fluid system described. Retraction of the friction element 40 to release the clamping grip of such element and the supplemental ring 31 on the shoes C when fluid pressure is released from the system is effected as by helical coil springs 70 that embrace end portions of the pins 66 projecting through the friction element 40 and into the annular channel 26. The springs 70 are compressed in place as by the drawing action of the cap screws 69 in assembly, the springs reacting against the outer or friction face 41 of the friction element 40 and against heads 71 on the outer ends of the pins.

The geometry of the device is such that upon retraction of the friction ring element 40 under the force exerted by the springs 70 the friction surfaces 41 of the friction ring element and 42 of the supplemental ring release their grip on the lining surfaced flanges 25 of the shoes C, permitting the latter and the entire inner composite clutch member A to turn independently of the outer composite member B. Upon the retraction of the friction ring element 40 as described a clearance 72 occurs between the friction element and the facing 27 on the confronting side of the shoe flange 25. A similar clearance 73 occurs on the opposite side of the shoe between the friction surface 42 of the supplemental ring 31 and the shoe lining 27 by reason of axial shifting of the shoes on the pins 20 that is inherent in the axial floating suspension of the shoes.

In the torque transmitting device of the present invention there is thus provided a combination of parts wherein the relatively rotatable members turn about a common axis. One member comprises a hub body and a plurality of shoes projecting radially cantilever fashion from the hub body in a common plane. The other member of the device surrounds or encompasses the shoe carrying member and is formed with an annular channel into which the shoes project. Also received in the channel of the outer or encompassing member and carried by the latter to turn therewith is an annular friction element axially shiftable to grip the shoes with the cooperation of a confronting companion part of the outer member. The gripping action is energized by a plurality of fluid motors acting along parallel lines and carried by the outer member of the structure at circumferentially spaced positions.

In accordance with the patent statutes the principles of the present invention may be utilized in various ways, numerous modifications and alterations being contemplated, substitution of parts and changes in construction being resorted to as desired, it being understood that the embodiment shown in the drawings and described above is given merely for purposes of explanation and illustration without intending to limit the scope of the claims to the specific details disclosed.

What I claim and desire to secure by Letters Patent of the United States is:

1. In a torque transmitting device of the type comprising a shaft and force and reaction members mounted on said shaft for relative rotation, one of the members having a hub surrounding the shaft, a fluid motor carried by one of the members, a support member located beyond and axially spaced, with clearance, from said hub and one end of the shaft, a plurality of studs having inner ends rigidly secured to the hub and outer ends detachably secured to the support member for removal and replacement of the latter from and onto such outer ends of the studs, said studs being generally parallel to the rotational axis of the shaft, a fluid joint of relatively rotatable interconnected parts, one joint part being secured to the support member wholly beyond said shaft end and with the rotational axis of the joint coinciding with the shaft axis, the other joint part being adapted to receive fluid under pressure and to transmit such fluid to said one rotatable joint part during relative rotation of the joint parts, and conduit means connecting the one part of the fluid joint to the fluid motor and extending radially outwardly of the one part of the joint.

2. In a torque transmitting device of the type comprising a shaft and force and reaction members mounted on said shaft adjacent one end of the latter, one member being fast to the shaft, the other member being rotatable on and relative to the shaft and located between the shaft end and said one member, a retainer on said end of the shaft to hold said other member in place, a fluid motor carried by said rotatable member, friction means for establishing a driving connection between the members and arranged to be actuated by the fluid motor, a support member located on the rotational axis of the shaft beyond and axially spaced, with clearance, from said rotatable member and said one end, studs located radially outwardly of the retainer and extending between said rotatable member and the support member to secure the latter to the rotatable member for rotation in unison, said studs having inner ends rigidly secured to the rotatable member and outer ends detachably secured to the support member for removal and replacement of the latter from and onto such outer ends of the studs, a fluid joint of relatively rotatable interconnected parts, one joint part being secured to the support member wholly beyond said shaft end and with the rotational axis of the joint coinciding with the shaft axis, the other joint part being adapted to receive fluid under pressure and to transmit such fluid to said one rotatable joint part during relative rotation of the joint parts, and conduit means connecting the one part of the fluid joint to the fluid motor and extending radially outwardly of the one part of the joint.

3. In combination, a shaft, a flywheel and a torque transmitting device adapted to be mounted on said shaft, the device comprising force and reaction members one of which is secured to the flywheel in spaced relation thereto for rotation in unison, friction means carried by the members, said one member being formed with a chamber having an opening facing toward the flywheel, a piston in said chamber, a closure for the chamber opening disposed in the space between the one member and the flywheel, means securing the closure to the one member across the opening for facile removal and replacement, the flywheel being formed with an opening into said space through which access is gained to the one member and the closure carried by the latter, the flywheel having a central hub received on the shaft, a retainer on one end of the shaft arranged to bear against the flywheel hub and thereby hold the flywheel in place, a fluid coupling of relatively rotatable parts, means mounting the coupling beyond said end of the shaft and in coaxial relation to the shaft, said mounting means being independent of the retainer and shaft and including an element secured to the flywheel hub and extending therefrom axially beyond the retainer and separated axially from said end of the shaft by an intervening clearance space, one of the parts of the coupling being secured to the outer end of the mounting element, a conduit extending through the access opening in the flywheel between said one part of the rotary coupling and the closure for carrying fluid under pressure to the chamber, the conduit being secured one end directly to the one coupling part the other end directly to the closure and wholly supported by its ends, and means connected to the other part of the coupling for conducting fluid under pressure to such coupling.

4. In a press or the like having a frame formed with a bearing, a shaft rotatably mounted in the bearing and a flywheel having a hub received on the shaft to support the flywheel in relatively rotatable relation on the shaft, a torque transmitting device for establishing a driving connection between the flywheel and the shaft, said device comprising a shoe hub fast on the shaft, a plurality of segmental friction shoes disposed about the shoe hub in a common plane normal to the rotational axis of the shaft, each shoe having a base and a body portion, the body portion of each shoe projecting radially outward from the base portion of such shoe and each base portion being of greater axial thickness than the body portion, pins angularly spaced about the shoe hub and disposed with their axes parallel to one another and to the shaft axis, the base portion of each shoe having a plurality of said pins projecting therethrough to hold the shoe in nonrotative relation to the shoe hub, each pin having its opposite ends supported by the shoe hub at axially spaced points on opposite sides of the base portion of the corresponding shoe, a circular disk member secured to the flywheel and having an annular outer rim, the disk member having a central opening formed to receive the flywheel hub, a flat supplemental ring disposed in generally parallel axially spaced relation to the disk member, means securing the outer periphery of the supplemental ring to the rim of the disk member for facile removal and replacement of the supplemental ring, the ring having an inner periphery received about the shoe hub and defining a central opening, the body portions of the shoes being disposed in the space between the disk member and the ring and the base portions of the shoes projecting axially through the central opening of the ring; an annular friction element interposed between the body portions of the shoes and said disk member, pins carried by the disk member and projecting cantilever fashion into the space between the disk member and the ring, the annular friction element being slidingly mounted on the cantilever pins for axial movement toward and away from the supplemental ring in clamping the shoes, said cantilever pins being wholly supported by the disk member to maintain the annular friction element in predetermined relation to the disk member and the shoes upon removal of the supplemental ring, the shoes being removable from and replaceable on the shoe hub for servicing while the disk member remains secured to the flywheel upon removal of the supplemental ring from the disk member and withdrawal of the shoe pins from the shoes and the shoe hub, and motor means carried by the disk member for actuating the friction element in clamping the shoes.

5. In a press or the like having a frame formed with a bearing, a shaft rotatably mounted in the bearing and a flywheel having a hub received on the shaft to support the flywheel in relatively rotatable relation on the shaft, a torque transmitting device for establishing a driving connection between the flywheel and the shaft, said device comprising a shoe hub fast on the shaft between the bearing and the flywheel, a retainer normally holding the flywheel on the shaft with the hub of the flywheel adjacent the shoe hub, a plurality of segmental friction shoes disposed about the shoe hub in a common plane normal to the rotational axis of the shaft, each shoe having a base and a body portion, the body portion of each shoe projecting radially outward from the base portion of such shoe and each base portion being of greater axial thickness than the body portion, pins angularly spaced about the shoe hub and disposed with their axes parallel to one another and to the shaft axis.

the base portion of each shoe having a plurality of said pins projecting therethrough to hold the shoe in nonrotative relation to the shoe hub, each pin having its opposite ends slidingly supported by the shoe hub at axially spaced points on opposite sides of the base portion of the corresponding shoe and having a head disposed between the shoe hub and the flywheel hub, a circular disk member between the flywheel and the frame, such disk member being secured to the flywheel and having an annular outer rim, the disk member having a central opening formed to receive the flywheel hub, a flat supplemental ring disposed in generally parallel axially spaced relation to the disk member, means securing the outer periphery of the supplemental ring to the rim of the disk member for facile removal and replacement of the supplemental ring, the ring having an inner periphery received about the shoe hub and defining a central opening, the body portions of the shoes being disposed in the space between the disk member and the ring and the base portions of the shoes projecting axially through the central opening of the ring; an annular friction element interposed between the body portions of the shoes and said disk member, pins carried by the disk member and projecting cantilever fashion into the space between the disk member and the ring, the annular friction element being slidingly mounted on the cantilever pins for axial movement toward and away from the supplemental ring in clamping the shoes, said cantilever pins being wholly supported by the disk member to maintain the annular friction element in predetermined relation to the disk member and the shoes upon removal of the supplemental ring, the shoes being removable from and replaceable on the shoe hub for servicing while the disk member remains secured to the flywheel upon removal of the retainer and axial shifting of the flywheel on the shaft away from the shoe hub upon removal of the supplemental ring from the disk member and upon withdrawal of the shoe pins from the shoes and the shoe hub, and motor means carried by the disk member for actuating the friction element in clamping the shoes.

6. In combination with a flywheel having a hub and a shaft on which the flywheel is rotatably mounted, a clutch device for drivingly connecting the flywheel to the shaft; said device comprising a shoe hub mounted on and secured to the shaft for rotation therewith; friction shoe means and means mounting such shoe means on the shoe hub in nonrotative axially shiftable relation; a circular disk element having oppositely directed side faces and a central opening received about the shaft and the hub of the flywheel in radially spaced relation; means having connection with the disk element solely at its outer periphery, securing the disk element to the flywheel for rotation in unison and constituting the sole support for the disk element; a circular friction element having a friction surface disposed in axially spaced confronting relation to one of the side faces of the disk element; means having connection with the friction element solely at its outer periphery, securing it to the outer periphery of the disk element for facile removal and replacement and constituting its sole support; the friction element having a central opening, the shoe hub being disposed in and extending through such friction element opening in spaced relation; said friction shoe means extending radially outwardly from the shoe hub into the space between the disk and friction elements; an annular ring element interposed between the shoe means and said one face of the disk element, the ring element having an inner periphery surrounding and radially spaced from the shoe hub; pin means fast solely to the disk element and projecting from the latter axially into the space between the disk and friction elements at points radially outwardly of the shoe means, said pin means being independent of the friction element and having connection with the ring element only adjacent the outer periphery of the latter and supporting the ring element for axial shifting movement to and from the shoe means, said pin means constituting the sole support for the ring element whereby the device is adapted for removal of the friction element for access to and removal of the shoe means while the ring element is so supported and independently of the latter, said disk element being formed with a circular sectioned chamber, one end of said chamber opening through said one side face of the disk element, a piston in the chamber and having on one end a circular thrust face, the piston being movable axially in the chamber to project the piston face through the chamber end opening to bear directly against the ring element, means closing the other end of the chamber, and means for introducing fluid under pressure into the chamber between the closing means and the piston.

7. In combination with a flywheel having a hub and a shaft on which the flywheel is rotatably mounted, a clutch device for drivingly connecting the flywheel to the shaft; said device comprising a shoe hub mounted on and secured to the shaft for rotation therewith; friction shoe means and means mounting such shoe means on the shoe hub in nonrotative axially shiftable relation; a circular disk element having oppositely directed side faces and a central opening received about the shaft and the hub of the flywheel in radially spaced relation; means having connection with the disk element solely at its outer periphery, securing the disk element to the flywheel for rotation in unison and constituting the sole support for the disk element; a circular friction element having a friction surface disposed in axially spaced confronting relation to one of the side faces of the disk element; means having connection with the friction element solely at its outer periphery, securing it to the outer periphery of the disk element for facile removal and replacement and constituting its sole support; the friction element having a central opening, the shoe hub being disposed in and extending through such friction element opening in spaced relation; said friction shoe means extending radially outwardly from the shoe hub into the space between the disk and friction elements; an annular ring element interposed between the shoe means and said one face of the disk element, the ring element having an inner periphery surrounding and radially spaced from the shoe hub; pin means fast solely to the disk element and projecting from the latter axially into the space between the disk and friction elements at points radially outwardly of the shoe means, said pin means being independent of the friction element and having connection with the ring element only adjacent the outer periphery of the latter and supporting the ring element for axial shifting movement to and from the shoe means, said pin means constituting the sole support for the ring element whereby the device is adapted for removal of the friction element for access to and removal of the shoe means while the ring element is so supported and independently of the latter, motor means carried by said disk element, said motor means being adapted to effect said axial shifting movement of the ring element toward the shoe means, and means for energizing and deenergizing the motor means during rotation of the disk.

8. In combination with a flywheel having a hub and a shaft on which the flywheel is rotatably mounted, a clutch device for drivingly connecting the flywheel to the shaft; said device comprising a shoe hub mounted on and secured to the shaft for rotation therewith; friction shoe means and means mounting such shoe means on the shoe hub in nonrotative axially shiftable relation; a circular disk element having oppositely directed side faces and a central opening received about the shaft and the hub of the flywheel in radially spaced relation; means having connection with the disk element solely at its outer periphery, securing the disk element to the flywheel for rotation in unison and constituting the sole support for the disk element; a circular friction element having a friction surface disposed in axially spaced confronting relation to one of the side faces of the disk element; means having connection with the friction element solely at its outer periphery, securing it to the outer periphery of the disk element for facile removal and replacement and constituting its sole support; the friction element having a central opening, the shoe hub being disposed in and extending through such friction element opening in spaced relation; said friction shoe means extending radially outwardly from the shoe hub into the space between the disk and friction elements; an annular ring element interposed between the shoe means and said one face of the disk element, the ring element having an inner periphery surrounding and radially spaced from the shoe hub; pin means fast solely to the disk element and projecting from the latter axially into the space between the disk and friction elements at points radially outwardly of the shoe means, said pin means being independent of the friction element and having connection with the ring element only adjacent the outer periphery of the latter and supporting the ring element for axial shifting movement to and from the shoe means, said pin means constituting the sole support for the ring element whereby the device is adapted for removal of the friction element for access to and removal of the shoe means while the ring element is so supported and independently of the latter, fluid motor means carried by said disk element and adapted to act against the ring element in effecting said shifting of the latter toward the shoe means, a rotary fluid coupling, means supporting the fluid coupling on the rotational axis of the device, and conduit means extending through the flywheel and connecting the fluid coupling to the fluid motor means.

9. In combination with a flywheel having a hub and a shaft on which the flywheel is rotatably mounted, a clutch device for drivingly connecting the flywheel to the shaft; said device comprising a shoe hub mounted on and secured to the shaft for rotation therewith; friction shoe means and means mounting such shoe means on the shoe hub in nonrotative relation; a circular disk element having oppositely directed side faces and a central opening, said element being received about the shaft and secured to the flywheel, a circular friction element having a friction surface disposed in axially spaced confronting relation to one of the side faces of the disk element; means having connection with the friction element solely at its outer periphery, securing it to the outer periphery of the disk element for facile removal and replacement and constituting its sole support; the friction element having a central opening, the shoe hub being disposed in and extending through such friction element opening in spaced relation; said friction shoe means extending radially outwardly from the shoe hub into the space between the disk and friction elements; an annular ring element interposed between the shoe means and said one face of the disk element, the ring element having an inner periphery surrounding and radially spaced from the shoe hub; a plurality of pins secured rigidly and solely to the disk element at circumferentially spaced points and projecting cantilever fashion from said one side face of such disk element toward the friction element, said pins being located radially outwardly beyond the shoe means in the space between the disk and friction elements, said pins being independent of the friction element and having connection with the ring element only adjacent the outer periphery of the latter and supporting the ring element for axial shifting movement to and from the shoe means, said pins constituting the sole support for the ring element whereby the device is adapted for removal of the friction element for access to and removal of the shoe means while the ring element is so supported and independently of the latter, motor means carried by said disk element, said motor means being adapted to effect said axial shifting movement of the ring element toward the shoe means, and means for energizing and deenergizing the motor means during rotation of the disk.

10. In combination with a flywheel having a hub and a shaft on which the flywheel is rotatably mounted, a clutch device for drivingly connecting the flywheel to the shaft; said device comprising a shoe hub mounted on and secured to the shaft for rotation therewith; friction shoe means and means mounting such shoe means on the shoe hub in nonrotative relation; a circular disk element having oppositely directed side faces and a central opening, said element being received about the shaft and secured to the flywheel, a circular friction element having a friction surface disposed in axially spaced confronting relation to one of the side faces of the disk element; means having connection with the friction element solely at its outer periphery, securing it to the outer periphery of the disk element for facile removal and replacement and constituting its sole support; the friction element having a central opening, the shoe hub being disposed in and extending through such friction element opening in spaced relation; said friction shoe means extending radially outwardly from the shoe hub into the space between the disk and friction elements; an annular ring element interposed between the shoe means and said one face of the disk element, the ring element having an inner periphery surrounding and radially spaced from the shoe hub; a plurality of pins secured rigidly and solely to the disk element at circumferentially spaced points and projecting cantilever fashion from said one side face of such disk element toward the friction element, said pins being located radially outwardly beyond the shoe means in the space between the disk and friction elements, said pins being independent of the friction element and having connection with the ring element only adjacent the outer periphery of the latter and supporting the ring element for axial shifting movement to and from the shoe means, springs carried by said pins and reacting against the pins and the ring element to bias the latter toward the disk element, said pins constituting the sole support for the ring element whereby the device is adapted for removal of the friction element for access to and removal of the shoe means while the ring element is so supported and independently of the latter, and motor means actuatable to effect said shifting of the ring element toward the shoe means.

References Cited in the file of this patent

UNITED STATES PATENTS

| | | |
|---|---|---|
| 1,360,394 | Gordon | Nov. 30, 1920 |
| 2,095,094 | Glasner | Dec. 30, 1937 |
| 2,108,165 | Criley | Feb. 15, 1938 |
| 2,123,867 | Criley | July 19, 1938 |
| 2,252,906 | Williamson | Aug. 19, 1941 |
| 2,268,143 | Schmitter | Dec. 30, 1941 |
| 2,301,957 | Lang | Nov. 17, 1942 |
| 2,349,494 | Fawick | May 23, 1944 |
| 2,462,944 | Cardwell et al. | Mar. 1, 1949 |
| 2,465,810 | MacDonald et al. | Mar. 29, 1949 |
| 2,606,637 | Davoust | Aug. 12, 1952 |
| 2,610,719 | Hornbostel | Sept. 16, 1952 |
| 2,633,217 | Carlson | Mar. 31, 1953 |
| 2,653,833 | Barron | Sept. 29, 1953 |
| 2,656,905 | Langdon | Oct. 27, 1953 |
| 2,759,582 | Dehn | Aug. 21, 1956 |
| 2,785,781 | Johnansen | Mar. 19, 1957 |

FOREIGN PATENTS

| | | |
|---|---|---|
| 514,638 | France | Nov. 17, 1920 |
| 636,240 | France | Jan. 7, 1928 |
| 460,824 | Great Britain | Feb. 4, 1937 |
| 684,091 | Germany | Nov. 22, 1939 |
| 131,749 | Australia | Mar. 14, 1949 |
| 259,546 | Switzerland | June 16, 1949 |